(12) United States Patent
Dong

(10) Patent No.: US 12,413,350 B2
(45) Date of Patent: Sep. 9, 2025

(54) METHOD AND APPARATUS FOR CONFIGURING ACKNOWLEDGE FEEDBACK POLICY, AND METHOD AND APPARATUS FOR ACKNOWLEDGE FEEDBACK

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 423 days.

(21) Appl. No.: 18/000,241

(22) PCT Filed: Jun. 1, 2020

(86) PCT No.: PCT/CN2020/093756
§ 371 (c)(1),
(2) Date: Nov. 29, 2022

(87) PCT Pub. No.: WO2021/243520
PCT Pub. Date: Dec. 9, 2021

(65) Prior Publication Data
US 2023/0353320 A1    Nov. 2, 2023

(51) Int. Cl.
*H04L 1/00*      (2006.01)
*H04L 1/1867*    (2023.01)
*H04L 5/00*      (2006.01)

(52) U.S. Cl.
CPC .......... *H04L 1/1896* (2013.01); *H04L 5/0053* (2013.01)

(58) Field of Classification Search
CPC ............... H04L 1/1896; H04L 5/0053; H04L 2001/0093; H04L 1/1685; H04L 1/12
See application file for complete search history.

(56) References Cited

U.S. PATENT DOCUMENTS 7,697,561 B2    4/2010 Nishibayashi et al.
10,484,159 B2   11/2019 Asterjadhi et al.
(Continued)

FOREIGN PATENT DOCUMENTS

CN    1665195 A     9/2005
CN    106464634 A   2/2017
(Continued)

OTHER PUBLICATIONS

3GPP TSG-RAN WG2 Meetng#86, R2-142009 Title:ACK/NACK feedback mode on PUSCH (Year: 2014).*
(Continued)

*Primary Examiner* — Faruk Hamza
*Assistant Examiner* — Abusayeed M Haque
(74) *Attorney, Agent, or Firm* — Oblon, McClelland, Maier & Neustadt, L.L.P.

(57) ABSTRACT

The present disclosure provides a method and apparatus for configuring an acknowledge (ACK) feedback policy, and a method and apparatus for an acknowledge (ACK) feedback. The method for configuring the ACK feedback policy includes: in response to that first data frames corresponding to a same traffic identifier (TID) are to be transmitted to a receiving terminal through multiple connections, configuring ACK feedback policies for second data frames transmitted through respective connections in the multiple connections as a same target ACK feedback policy, wherein the second data frames are at least the same as a part of the first data frames; and transmitting the second data frames to the receiving terminal through the respective connections.

17 Claims, 7 Drawing Sheets

(56) References Cited

U.S. PATENT DOCUMENTS

| | | |
|---|---|---|
| 2005/0195858 A1 | 9/2005 | Nishibayashi et al. |
| 2013/0301569 A1* | 11/2013 | Wang .................... H04L 1/1864 370/329 |
| 2016/0036701 A1 | 2/2016 | Park |
| 2016/0302229 A1 | 10/2016 | Hedayat |
| 2017/0111951 A1* | 4/2017 | Chu ...................... H04L 1/1671 |
| 2017/0373813 A1 | 12/2017 | Asterjadhi et al. |
| 2018/0020372 A1* | 1/2018 | Viger ................ H04W 28/0278 |
| 2018/0020373 A1* | 1/2018 | Viger .................... H04W 72/52 |
| 2018/0184453 A1* | 6/2018 | Viger .................. H04W 74/085 |
| 2018/0270861 A1* | 9/2018 | Baron ............... H04W 74/0816 |
| 2018/0332502 A1* | 11/2018 | Chu ...................... H04L 1/1671 |
| 2019/0319738 A1 | 10/2019 | Ahn et al. |
| 2020/0374907 A1* | 11/2020 | Viger .................... H04W 76/14 |

FOREIGN PATENT DOCUMENTS

| | | | |
|---|---|---|---|
| CN | 106656429 A | 5/2017 | |
| CN | 106797294 A | 5/2017 | |
| CN | 107771376 A | 3/2018 | |
| CN | 109417546 * | 3/2019 | ............. H04L 69/09 |
| CN | 109417546 A | 3/2019 | |
| CN | 110089148 A | 8/2019 | |
| CN | 110830175 A | 2/2020 | |
| CN | 110838863 A | 2/2020 | |
| CN | 110858794 A | 3/2020 | |

OTHER PUBLICATIONS

3GPP TSG-RAN WG2 Meetng#99, R2-1708633 Title:CRS muting (Year: 2017).*

Combined Chinese Office Action and Search Report issued Mar. 29, 2024 in Chinese Patent Application No. 202080001151.2 (with unedited computer-generated English Translation of Office Action only), 21 pages.

Written Opinion of the International Searching Authority issued Feb. 20, 2021 in PCT/CN2020/093756 (with English Translation), 9 pages.

Combined Chinese Office Action and Search Report issued Jul. 2, 2024 in Chinese Patent Application No. 2020800011512 (with unedited, machine-generated English translation), 21 pages.

International Search Report with English translation mailed on Feb. 20, 2021 in PCT/CN2020/093756 filed on Jun. 1, 2020 (4 pages).

* cited by examiner

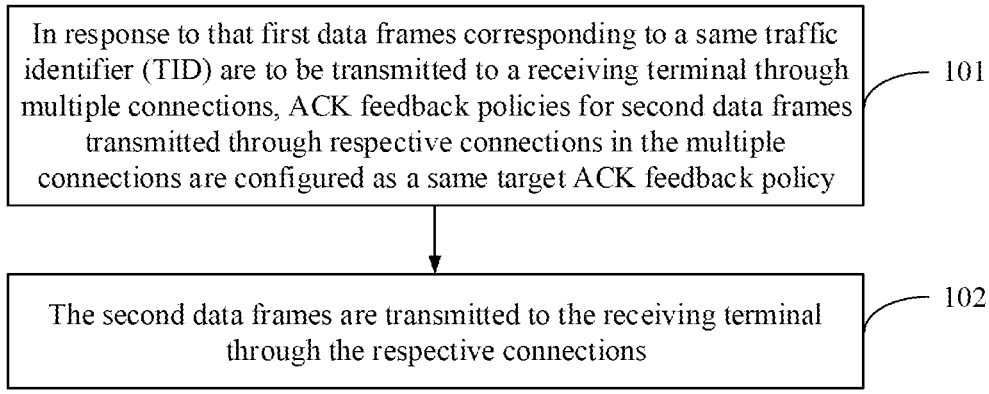

FIG. 1

| Frame Control Field | Duration/ Identifier | Address 1 | Address 2 | Address 3 | Sequence Control Field | Address 4 | QoS Control Field | HT Control Field | Frame Content | Frame Check Sequence |

FIG. 2

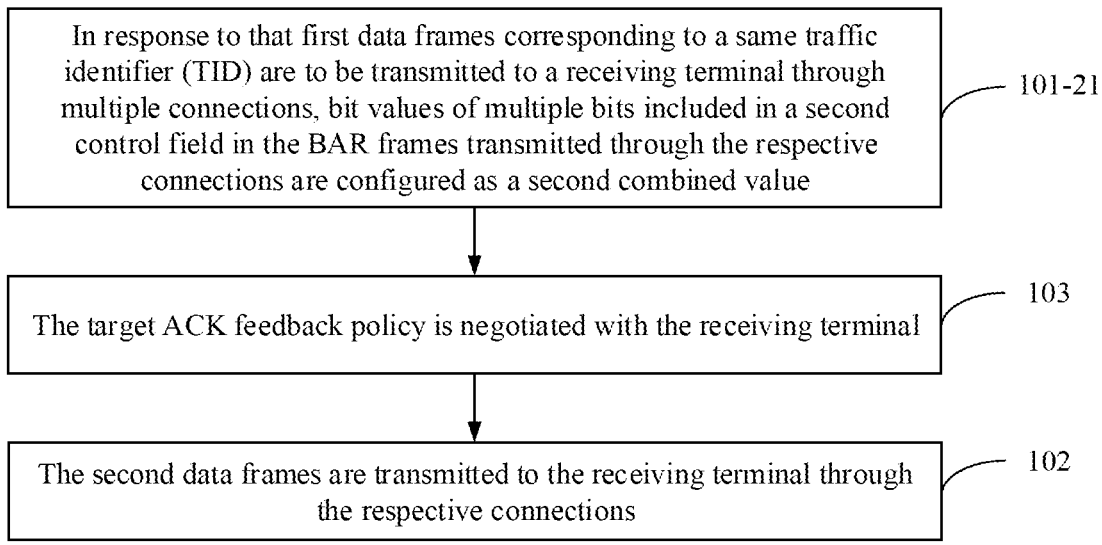

FIG. 3

| Frame Control Field | Duration | Receiving address | Transmitting Address | BAR Control Field | BAR information Field | Frame Check Sequence |

FIG. 4

| BAR ACK Policy | Multi-TID | Compressed Bitmap | Calling Group Register | Reserved | TID Information |

FIG. 5

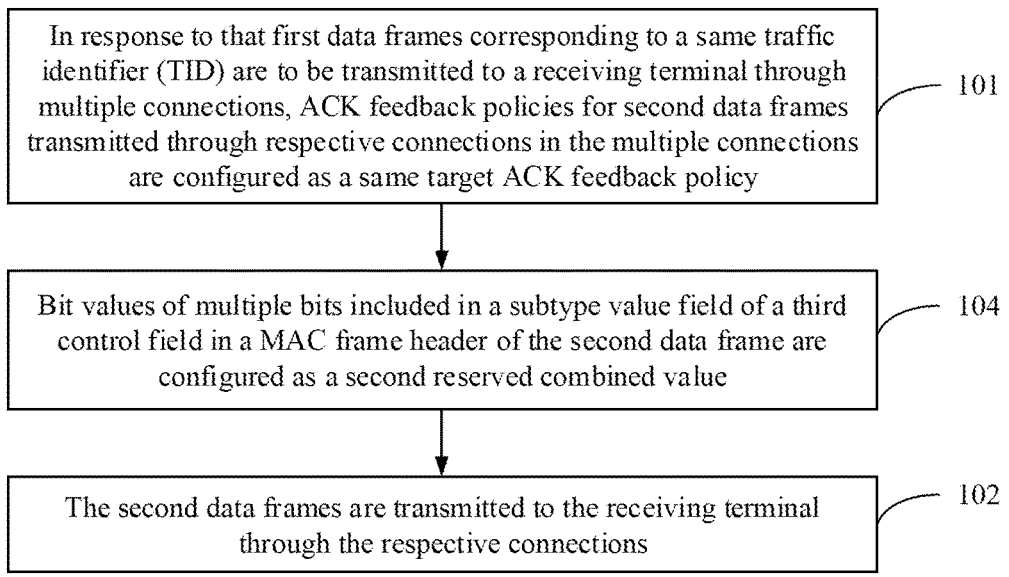
FIG. 6
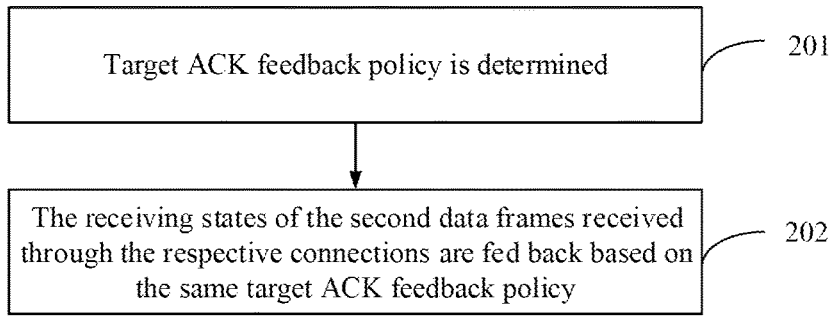
FIG. 7
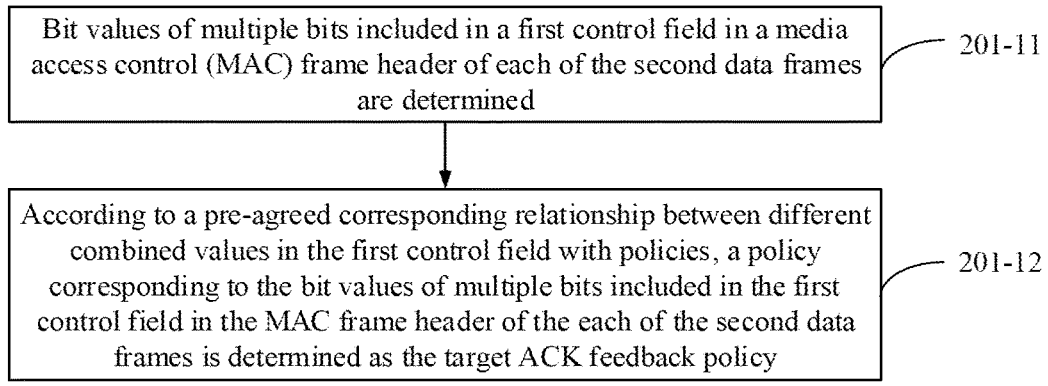
FIG. 8
FIG. 9

METHOD AND APPARATUS FOR CONFIGURING ACKNOWLEDGE FEEDBACK POLICY, AND METHOD AND APPARATUS FOR ACKNOWLEDGE FEEDBACK

CROSS REFERENCE TO RELATED APPLICATIONS

This application is the national phase of International Application No. PCT/CN2020/093756 filed on Jun. 1, 2020, the disclosure of which is hereby incorporated by reference in its entirety.

BACKGROUND OF THE INVENTION

Field of the Invention

The present disclosure relates to the field of communication technologies, and in particular to a method and apparatus for configuring an acknowledge (ACK) feedback policy, a method and apparatus for an acknowledge (ACK) feedback, and storage medium.

Description of the Related Art

The Institute of Electrical and Electronics Engineers (IEEE) 802.11 has established a study group (SG) IEEE802.11be to study next generation mainstream wireless fidelity (Wi-Fi) technologies. The studied scope includes transmission at up to 320 MHz bandwidth, aggregation and coordination of multiple frequency bands, and the like; and the proposed goal is to improve the speed and throughput of the existing 802.11ax by at least four times. Main application scenarios are augmented reality (AR), virtual reality (VR), and the like.

The aggregation and coordination of multiple frequency bands means that devices will be able to communicate simultaneously in frequency bands of 2.4 GHz, 5.8 GHZ and 6-7 GHz. It is necessary to define a new media access control (MAC) mechanism to manage the devices that will be able to communicate simultaneously in multiple frequency bands. Another goal of IEEE802.11be is to support low latency transmission.

At present, after a transmitting terminal transmits Quality of Service (QOS) data frames to a receiving terminal through one connection, it is necessary for the receiving terminal to feed back a receiving state, that is, to perform an ACK (Acknowledge) feedback. However, for the case that the transmitting terminal transmits the QoS data frames through multiple connections, relevant ACK feedback policies have not been discussed. The existing standard is only applicable to transmit the QoS data frames through a single connection.

SUMMARY OF THE INVENTION

In order to overcome problems in related technologies, embodiments of the present disclosure provide a method and apparatus for configuring an acknowledge (ACK) feedback policy, a method and apparatus for an acknowledge (ACK) feedback, and storage medium.

According to a first aspect of the embodiments of the present disclosure, there is provided a method for configuring an acknowledge (ACK) feedback policy, including, in response to that first data frames corresponding to a same traffic identifier (TID) are to be transmitted to a receiving terminal through multiple connections, configuring ACK feedback policies for second data frames transmitted through respective connections in the multiple connections as a same target ACK feedback policy, where the second data frames are at least the same as a part of the first data frames, and transmitting the second data frames to the receiving terminal through the respective connections.

According to a second aspect of the embodiments of the present disclosure, there is provided a method for an acknowledge (ACK) feedback, including determining a target ACK feedback policy, where the target ACK feedback policy is an ACK feedback policy configured by a transmitting terminal for a receiving terminal to feed back receiving states of second data frames after receiving the second data frames through respective connections in multiple connections, and the second data frames are at least the same as a part of first data frames corresponding to the same traffic identifier (TID), and feeding back the receiving states of the second data frames received through the respective connections based on a same target ACK feedback policy.

According to a third aspect of the embodiments of the present disclosure, there is provided a computer readable storage medium storing a computer program, where the computer program is configured to execute the method for configuring the acknowledge (ACK) feedback policy described in any one of the above first aspect.

According to a fourth aspect of the embodiments of the present disclosure, there is provided an apparatus for configuring an acknowledge (ACK) feedback policy, including a processor and a memory for storing instructions executable by the processor. The processor is configured to execute the method for configuring the acknowledge (ACK) feedback policy described in any one of the above first aspect.

According to a fifth aspect of the embodiments of the present disclosure, there is provided an apparatus for an acknowledge (ACK) feedback, including a processor and a memory for storing instructions executable by the processor. The processor is configured to execute the method for the acknowledge (ACK) feedback described in any one of the above second aspect.

It should be understood that the above general descriptions and subsequent detailed descriptions are merely illustrative and explanatory, and shall not constitute limitation to the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 1 is a schematic flowchart illustrating a method for configuring an acknowledge (ACK) feedback policy according to an exemplary embodiment.

FIG. 2 is a schematic structural diagram illustrating a media access control (MAC) frame header according to an exemplary embodiment.

FIG. 3 is a schematic flowchart illustrating a method for configuring an acknowledge (ACK) feedback policy according to an exemplary embodiment.

FIG. 4 is a schematic structural diagram illustrating a block acknowledgment request (BAR) frame according to an exemplary embodiment.

FIG. 5 is a schematic structural diagram illustrating a block acknowledgment request (BAR) control field according to an exemplary embodiment.

FIG. 6 is a schematic flowchart illustrating a method for configuring an acknowledge (ACK) feedback policy according to an exemplary embodiment.

FIG. 7 is a schematic structural diagram illustrating a frame control field according to an exemplary embodiment.

FIG. 8 is a schematic flowchart illustrating a method for an acknowledge (ACK) feedback according to an exemplary embodiment.

FIG. 9 is a schematic flowchart illustrating a method for an acknowledge (ACK) feedback according to an exemplary embodiment.

DETAILED DESCRIPTION OF THE PREFERRED EMBODIMENTS

Figure 10:
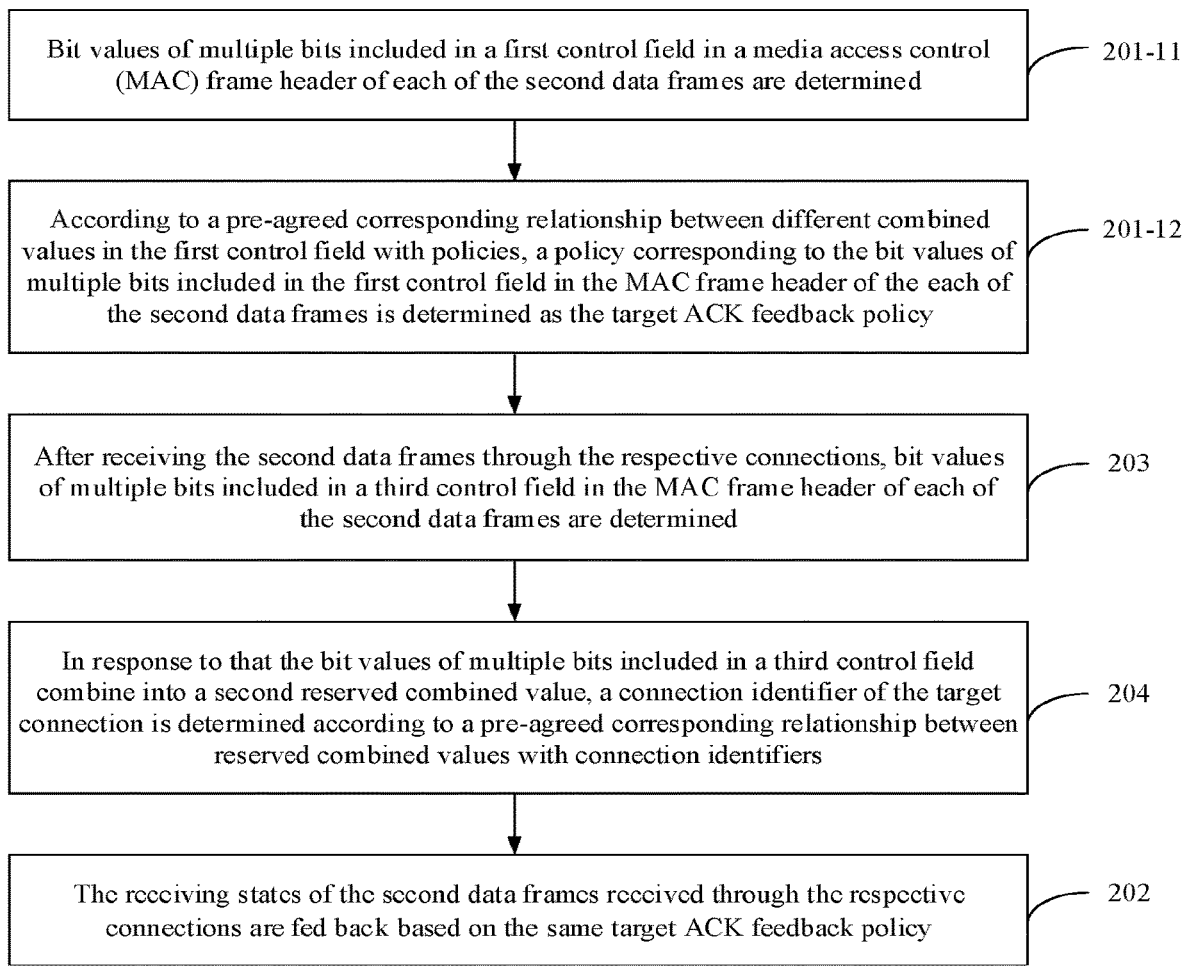
FIG. 10 is a schematic flowchart illustrating a method for an acknowledge (ACK) feedback according to an exemplary embodiment.

Exemplary embodiments will be described in detail here, examples of which are illustrated in the accompanying drawings. When the following description refers to the drawings, unless otherwise indicated, the same numerals in different drawings indicate the same or similar elements. The implementations set forth in the following description of exemplary embodiments do not represent all implementations consistent with the embodiments of the present disclosure. Instead, they are merely examples of apparatuses and methods consistent with aspects related to the embodiments of the present disclosure as recited in the appended claims.

Terms used in the embodiments of the present disclosure are only adopted for the purpose of describing specific embodiments and not intended to limit the embodiments of the present disclosure. The singular forms "a", "one" and "the" used in the present disclosure and the appended claims are also intended to include plural forms, unless the context clearly indicates other meanings. It should also be understood that the term "and/or" as used in the present disclosure refers to and includes any and all possible combinations of one or more of the associated listed items.

It should be understood that, although terms first, second, third and the like may be adopted to describe various information in the embodiments of the present disclosure, the information should not be limited to these terms. These terms are only used to distinguish the same type of information. For example, first information may also be referred to as second information, and similarly, the second information may also be referred to as the first information without departing from the scope of the embodiments of the present disclosure. For example, terms "if" and "in case of" used herein may be explained as "while" or "when" or "responsive to determining", which depends on the context.

The embodiments of the present disclosure provide a method for configuring an acknowledge (ACK) feedback policy, which can be applied to a transmitting terminal, for example, a base station. Referring to FIG. 1, FIG. 1 is a schematic flowchart illustrating a method for configuring an acknowledge (ACK) feedback policy according to an exemplary embodiment. The method includes the following steps.

In step 101, in response to that first data frames corresponding to a same traffic identifier (TID) are to be transmitted to a receiving terminal through multiple connections, ACK feedback policies for second data frames transmitted through respective connections in the multiple connections are configured as a same target ACK feedback policy.

In the embodiment of the present disclosure, multiple connections refers to a plurality of connections established when the transmitting terminal and the receiving terminal can communicate simultaneously based on different frequency bands. For example, the transmitting terminal can establish connections with the receiving terminal respectively in three frequency bands of 2.4 GHZ. 5.8 GHZ and 6-7 GHZ to obtain three different connections or connections formed by different bandwidths in the frequency band of 6-7 GHz, such as multiple bandwidths of 20 MHZ.

The first data frames and the second data frames can be QoS data frames, and the second data frames are at least the same as some data frames included in the first data frames. When the first data frames transmitted synchronously or asynchronously by the transmitting terminal through multiple connections correspond to the same TID, that is the same TID can be applied to different connections, the transmitting terminal can configure the ACK feedback policies for the second data frames transmitted through respective connections in the multiple connections as the same target ACK feedback policy.

For example, if the transmitting terminal transmits second data frames (for example, a second data frame 1 and a second data frame 2) to the receiving terminal synchronously or asynchronously through a connection 1 and a connection 2, and a TID corresponding to the second data frame 1 transmitted by the connection 1 is the same as that corresponding to the second data frame 2 transmitted by the connection 2, the transmitting terminal can configure ACK feedback policies for the second data frames transmitted through the above connection 1 and connection 2 as a same target ACK feedback policy.

In step 102, the second data frames are transmitted to the receiving terminal through the respective connections.

In the embodiment of the present disclosure, the corresponding second data frame is respectively transmitted to the receiving terminal through each of the multiple connections.

In the above embodiment, there is provided a multi-connectivity ACK feedback policy, and the ACK feedback policies for the second data frames transmitted through the respective connections are the same, and thus the transmitting terminal can more accurately and quickly determine the receiving states of the second data frames received by the receiving terminal through the respective connections, which not only reduces the transmission latency, but also improves the network throughput.

In an alternative embodiment, the number and content of the first data frames and the second data frames can include any one of the following cases.

In the first case, a number of the first data frames is one, data frames transmitted through the respective connections can be the same and a number of the data frames is one, and a number of the second data frames transmitted through each of the respective connections is one and the second data frames are the same as the first data frames. That is, in order to ensure communication reliability, the transmitting terminal transmits the same first data frame to the receiving terminal through different connections to ensure that the receiving terminal can receive the first data frame more accurately.

In the second case, the number of the first data frames is more than one, the number of the second data frames transmitted through each of the respective connections is more than one and the second data frames are different from each other, and a sum of all the second data frames is the same as the number of the first data frames.

That is, if the number of the first data frames is relatively large, the first data frames can be split, and the continuous data frames in each part obtained by splitting can be determined as the second data frames. Then, the second data frames are transmitted to the receiving terminal through different connections.

For example, a number of bytes occupied by a first data frame corresponding to an AR service reaches 1 megabyte. If the first data frame of 1 megabyte is transmitted to the receiving terminal through only one connection, it will take n milliseconds; and if the first data frame is divided into two parts, and each part includes a second data frame of 0.5 megabyte, then second data frames of 0.5 megabyte can be transmitted to the receiving terminal through the connection 1 and the connection 2, respectively, the process will only take n/2 milliseconds, thereby reducing the transmission latency and improving the network throughput.

For the first case mentioned above, step 101 can include step 101-11.

In step 101-11, bit values of multiple bits included in a first control field in a media access control (MAC) frame header of the second data frame transmitted through each of the respective connections are configured as a first combined value.

The first combined value is a combination of multiple bit values in the first control field which is pre-agreed as corresponding to the target ACK feedback policy, and the first control field can be a QoS control field.

In the embodiment of the present disclosure, the structure of the MAC frame header of the data frame is shown in FIG. 2. If the MAC frame header includes the QoS control field, the QoS control field occupies 2 bytes in the MAC frame header. The transmitting terminal can configure multiple bit values included in the QoS control field as different combined values to correspond to different policies, where the corresponding relationship between different combined values with policies is shown in Table 1.

TABLE 1

| Combined values corresponding to multiple bit values included in the QoS control field | | Policies |
|---|---|---|
| 0 | 0 | Normal Ack or Implicit Block Ack Request |
| 1 | 0 | No Ack |
| 0 | 1 | No explicit acknowledgment or PSMP (Power Save Multi-Poll) Ack |
| 1 | 1 | Block Ack |

In the embodiment of the present disclosure, the transmitting terminal can configure multiple bit values included in the QoS control field as different combined values, and indicate different ACK feedback policies to the receiving terminal. For example, if the multiple bit values included in the QoS control field are configured as "00", the receiving terminal will make a normal confirmation.

For the second case mentioned above, referring to FIG. 3, FIG. 3 is a schematic flowchart illustrating a method for configuring an acknowledge (ACK) feedback policy according to the embodiment shown in FIG. 1. Before step 102 is executed, the method can further include step 103. In step 103, the target ACK feedback policy is negotiated with the receiving terminal.

In the embodiment of the present disclosure, the transmitting terminal can transmit block acknowledgment request (BAR) frames to the receiving terminal through the respective connections, and negotiate the target ACK feedback policy with the receiving terminal.

Accordingly, step 101 can include step 101-21. In step 101-21, bit values of multiple bits included in a second control field in the BAR frames transmitted through the respective connections are configured as a second combined value.

In the embodiment of the present disclosure, the second combined value is a combination of multiple bit values in the second control field which is pre-agreed as corresponding to the target ACK feedback policy, and the second control field can be a BAR control field.

The structure of the BAR frame is shown in FIG. 4, and the structure of the BAR control field is shown in FIG. 5.

The corresponding relationship between different combined values corresponding to multiple bit values in the BAR control field with policies is shown in Table 2.

TABLE 2

| Multi-TID subfield value | Compressed Bitmap subfield value | GCR (Group Cast with Retries) subfield value | BAR frame varlant |
|---|---|---|---|
| 0 | 0 | 0 | Basic BAR |
| 0 | 1 | 0 | Compressed BAR frame |
| 1 | 0 | 0 | Extend Compressed BAR frame |
| 1 | 1 | 0 | Multi-TID BAR frame |
| 0 | 0 | 1 | Reserved |
| 0 | 1 | 1 | GCR BAR frame |
| 1 | 0 | 1 | Reserved |
| 1 | 1 | 1 | Reserved |

In the embodiment of the present disclosure, the transmitting terminal can configure multiple bit values included in the BAR control field as different second combined values in the above Table 2, and indicate different ACK feedback policies to the receiving terminal.

In an alternative embodiment, for any one of the above cases, the target ACK feedback policy can be configured to instruct the receiving terminal to feed back receiving states of the second data frames received through the respective connections via a same target connection.

The target connection is any one of the multiple connections, or the target connection is a connection different from the multiple connections, which is not limited in the embodiments of the present disclosure.

For example, the transmitting terminal transmits the corresponding second data frames to the receiving terminal through the connection 1 and the connection 2, respectively. The connection 1 can be used by the receiving terminal as a target connection to feed back the receiving states of the second data frames through the two connections, or the connection 2 can be used by the receiving terminal as the target connection to feed back the receiving states. Alternatively, a connection 3 other than the connection 1 and the connection 2 can also be used as the target connection to feed back the receiving states.

In the embodiment of the present disclosure, for the first case, that is, the number of the first data frames is one, and the number of the second data frames transmitted through each of the multiple connections is one and the second data frame is the same as the first data frame, referring to FIG. 6, FIG. 6 is a schematic flowchart illustrating a method for configuring an acknowledge (ACK) feedback policy according to the embodiment shown in FIG. 1. Before step 102 is executed, the method further includes step 104.

In step 104, bit values of multiple bits included in a subtype value field of a third control field in a MAC frame header of the second data frame are configured as a second reserved combined value.

The second reserved combined value is a combination of multiple bit values reserved in the subtype value field to indicate a connection identifier of the target connection, and the third control field can be a frame control field. The partial structure of the frame control field is shown in FIG. 7. Descriptions of different fields of the frame control field in the existing standards are shown in Table 3.

TABLE 3

| Type Value B2B3 | Type description | Subtype value B7B6B5B4 | Subtype description |
|---|---|---|---|
| 10 | Data | 0011 | Data + CF-ACK + CF-Poll |
| 10 | Data | 0100 | Null (no data) |
| 10 | Data | 0101 | CF-ACK (no data) |
| 10 | Data | 0110 | CF-Poll (no data) |
| 10 | Data | 0111 | CF-ACK + CF-Poll (no data) |
| 10 | Data | 1000 | QOS Data |
| 10 | Data | 1001 | QOS Data + CF-ACK |
| 10 | Data | 1010 | QoS Data + CF-Poll |
| 10 | Data | 1011 | QOS Data + CF-ACK + CF-Poll |
| 10 | Data | 1100 | QoS Null (no data) |
| 10 | Data | 1101 | Reserved (configured to indicate multi-link data frame) |
| 10 | Data | 1110 | QOS CF-ACK (no data) |
| 10 | Data | 1111 | QOS CF-Poll (no data) |

In the embodiment of the present disclosure, the connection identifier of the target connection can be indicated by configuring the bit values of multiple bits included in the subtype value field in the frame control field as the second reserved combined value, for example, 1101 or other reserved combined values. Assuming that the bit values of multiple bits included in the subtype value field are configured as 1101 in advance, and the connection identifier of the indicated target connection is the connection 1, the receiving terminal can directly feed back the receiving states of the second data frames received through respective connections via the connection 1 after receiving the second data frames through the respective connections.

In the embodiment of the present disclosure, for the second case, that is, the number of the first data frames is more than one, the number of the second data frames transmitted through the respective connections is more than one and the second data frames are different from each other, and the sum of all the second data frames is the same as the number of the first data frames. If step 101-21 is used to configure the bit values of multiple bits included in the second control field in each of the BAR frames as a second combined value, and the second combined value matches the first reserved combined value, for example, the second combined value is 1101, it is determined that the target ACK feedback policy is configured to instruct the receiving terminal to feed back the receiving states of the second data frames received through the respective connections via the same target connection.

Similarly, before step 102 is executed, the above step 104 can be executed, that is, the bit values of multiple bits included in the subtype value field of the third control field in the MAC frame header of the second data frame are configured as the second reserved combined value, so that the receiving terminal can feed back the receiving states of the second data frames via the target connection.

The target connection can be any one of the multiple connections, or the target connection can be a connection different from the multiple connections.

In the above embodiment, by configuring the target ACK feedback policy, the receiving terminal can be indicated to feed back the receiving states of the second data frames received through the respective connections via the same target connection, thereby having high availability.

For the method for configuring the ACK feedback policy by the transmitting terminal, the present disclosure further provides a method for an acknowledge (ACK) feedback, applied to a receiving terminal. The receiving terminal can be user equipment (UE). Referring to FIG. 8, FIG. 8 is a schematic flowchart illustrating a method for an acknowledge (ACK) feedback according to an exemplary embodiment. The method includes the following steps.

In step 201, a target ACK feedback policy is determined. The target ACK feedback policy is an ACK feedback policy configured by a transmitting terminal for a receiving terminal to feed back receiving states of second data frames after receiving the second data frames through respective connections in multiple connections, and the second data frames are at least the same as a part of first data frames corresponding to a same traffic identifier (TID).

In step 202, the receiving states of the second data frames received through the respective connections are fed back based on the same target ACK feedback policy. In the embodiment of the present disclosure, in response to that the second data frames received through the respective connections are the same as the first data frames and respective numbers of the second data frames are of a number of one, the receiving state is fed back through an ACK frame based on the target ACK feedback policy. If the second data frame received through each of the respective connections includes a plurality of continuous data frames, the receiving state is fed back through a block ACK (BA) frame based on the target ACK feedback policy.

In the above embodiment, the receiving terminal can use the same target ACK feedback policy to feed back the receiving state of the second data frame received through each of the respective connections, thereby reducing the network latency and improving the network throughput.

In an alternative embodiment, for the case where the receiving state is fed back through the ACK frame, referring to FIG. 9, FIG. 9 is a schematic flowchart illustrating a method for an acknowledge (ACK) feedback according to the embodiment shown in FIG. 8. The step 201 can include the following steps.

In step 201-11, bit values of multiple bits included in a first control field in a media access control (MAC) frame header of each of the second data frames are determined.

In the embodiment of the present disclosure, after receiving the second data frame through each of the respective connections, the receiving terminal can determine the first control field in the MAC frame header of each of the second data frames, that is, the bit values of multiple bits included in the QoS control field.

In step 201-12, according to a pre-agreed corresponding relationship between different combined values in the first control field with policies, a policy corresponding to the bit values of multiple bits included in the first control field in the MAC frame header of the each of the second data frames is determined as the target ACK feedback policy.

In the embodiment of the present disclosure, the policy corresponding to the bit values of multiple bits included in the first control field in the MAC frame header of the each of the second data frames can be determined according to Table 1, and the policy is used as the target ACK feedback policy.

Further, the target ACK feedback policy can directly indicate the receiving terminal to feed back the receiving states of the second data frames received through the respective connections via a same target connection. The target connection is any one of the multiple connections, or the target connection is a connection different from the multiple connections.

Accordingly, referring to FIG. 10, FIG. 10 is a schematic flowchart illustrating a method for an acknowledge (ACK) feedback according to the embodiment shown in FIG. 9. The method can further include the following steps.

In step 203, after receiving the second data frames through the respective connections, bit values of multiple bits included in a third control field in the MAC frame header of each of the second data frames are determined. The third control field can be a frame control field.

In step 204, in response to that the bit values of multiple bits included in a third control field combine into a second reserved combined value, a connection identifier of the target connection is determined according to a pre-agreed corresponding relationship between reserved combined values with connection identifiers.

If the bit values of multiple bits included in the frame control field are combined into the second reserved combined value, and the connection identifier of the target connection indicated by the second reserved combined value is pre-agreed, the receiving terminal can feed back the receiving state of the second data frame received through each of the respective connections via the target connection indicated by the second reserved combined value.

In an alternative embodiment, for the case where the receiving state is fed back through the BA frame, the step 201 can include step 201-21.

In step 201-21, before receiving the second data frames through the respective connections, the target ACK feedback policy is negotiated with the transmitting terminal.

In the embodiment of the present disclosure, before receiving the second data frames, the receiving terminal will receive the BAR frames transmitted by the transmitting terminal through the respective connections, and determine the bit values of multiple bits included in the second control field in the BAR frame. The second control field can be a BAR control field.

In the embodiment of the present disclosure, the receiving terminal can determine that the policy corresponding to the bit values of multiple bits included in the second control field in the BAR frame as the negotiated target ACK feedback policy according to the above Table 2.

In an alternative embodiment, if the bit values of multiple bits included in the second control field match the first reserved combined value in Table 2, it is determined that the target ACK feedback policy is configured to instruct the receiving terminal to feed back receiving states of the second data frames received through the respective connections via the same target connection.

Further, the receiving terminal can also determine the target connection according to the above steps 203-204, and then feed back the receiving state through the target connection.

In the above embodiment, the receiving terminal can feed back the receiving states of the second data frames received through the respective connections via the same target connection, thereby having high availability.

Figure 11:
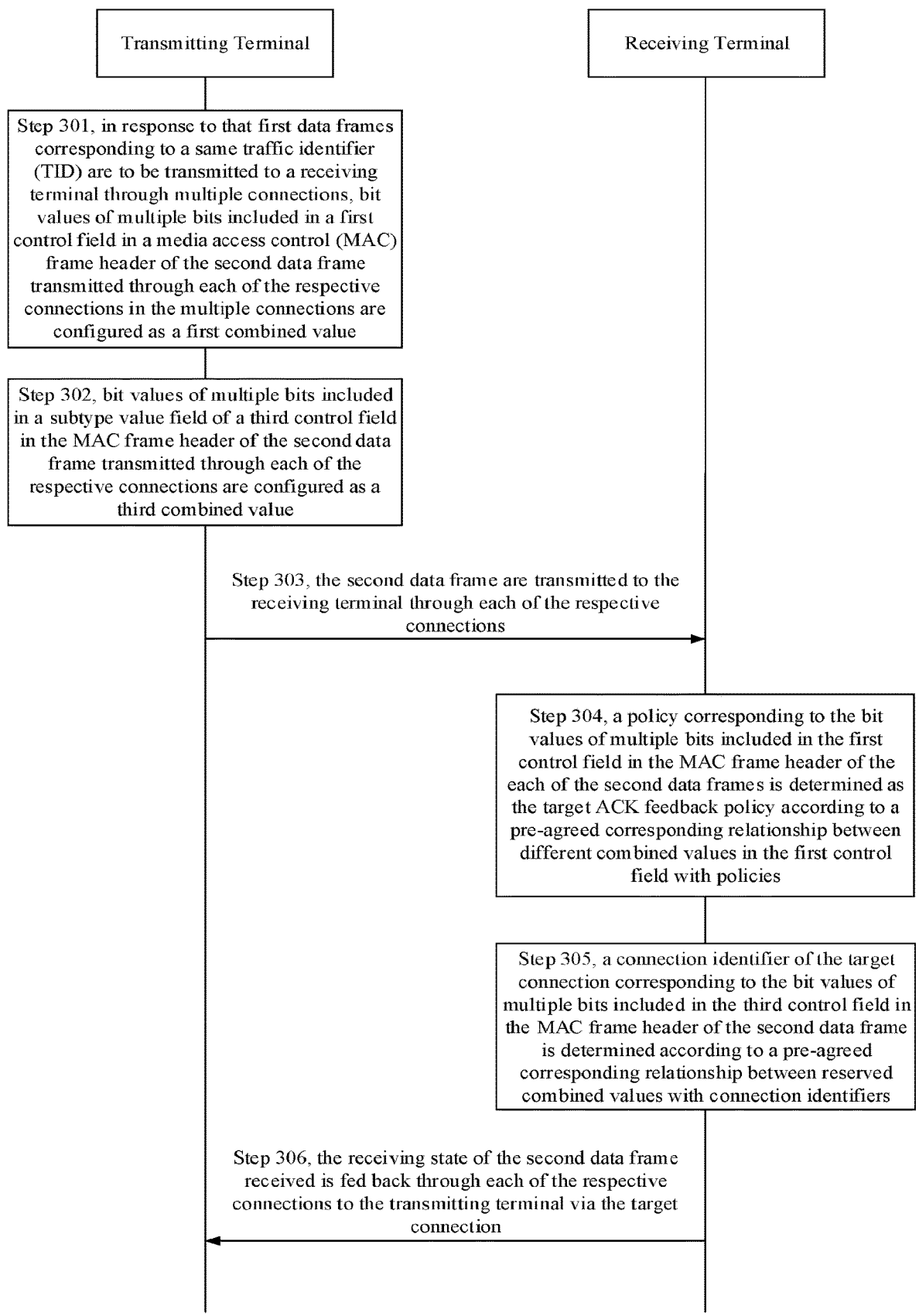
FIG. 11 is a schematic flowchart illustrating a method for an acknowledge (ACK) feedback policy configuration and feedback according to an exemplary embodiment.

In an alternative embodiment, referring to FIG. 11, FIG. 11 is a schematic flowchart illustrating a method for an acknowledge (ACK) feedback policy configuration and feedback according to an embodiment. The method can include the following steps.

In step 301, in response to that first data frames corresponding to a same traffic identifier (TID) are to be transmitted to a receiving terminal through multiple connections, a transmitting terminal configures bit values of multiple bits included in a first control field in a media access control (MAC) frame header of the second data frame transmitted through each of the respective connections in the multiple connections as a first combined value.

The number of the first data frames is one, the number of the second data frames transmitted through each of the respective connections is one and is the same as the first data frame, and the first combined value is a combination of multiple bit values in the first control field which is pre-agreed as corresponding to the target ACK feedback policy.

In step 302, the transmitting terminal configures bit values of multiple bits included in a subtype value field of a third control field in the MAC frame header of the second data frame transmitted through each of the respective connections as a third combined value.

The third combined value is a combination of multiple bit values reserved in the subtype value field to indicate a connection identifier of the target connection.

In step 303, the transmitting terminal transmits the second data frame to the receiving terminal through each of the respective connections.

In step 304, the receiving terminal determines a policy corresponding to the bit values of multiple bits included in the first control field in the MAC frame header of the each of the second data frames as the target ACK feedback policy according to a pre-agreed corresponding relationship between different combined values in the first control field with policies.

In step 305, the receiving terminal determines a connection identifier of the target connection corresponding to the bit values of multiple bits included in the third control field in the MAC frame header of the second data frame according to a pre-agreed corresponding relationship between reserved combined values with connection identifiers.

In step 306, the receiving terminal feeds back the receiving state of the second data frame received through each of the respective connections to the transmitting terminal via the target connection.

In the above embodiment, there is provided a multi-connectivity ACK feedback policy, so that the transmitting terminal can more accurately and quickly determine the receiving states of the second data frames received by the receiving terminal through the respective connections, thereby ensuring communication reliability.

Figure 12:
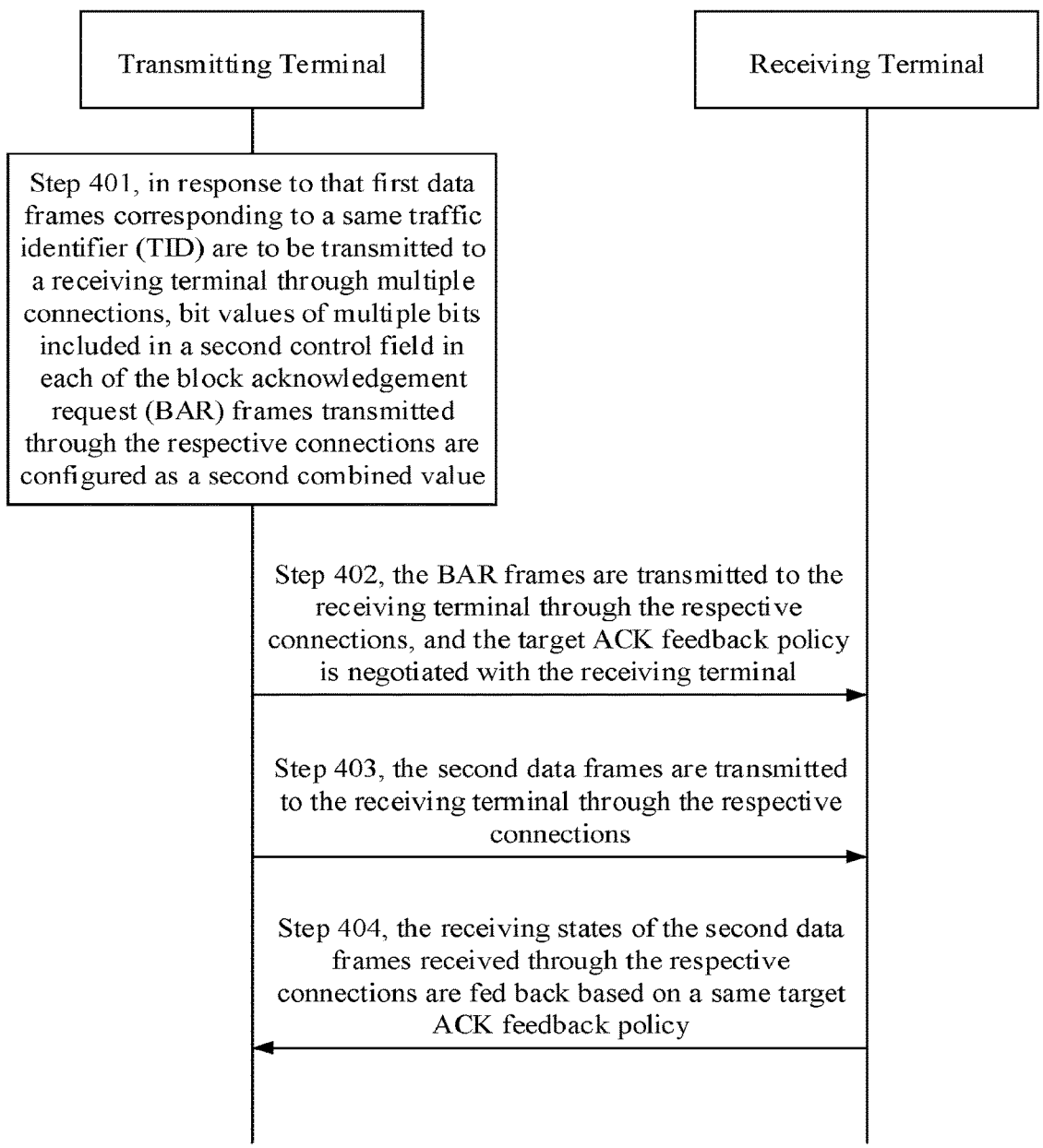
FIG. 12 is a schematic flowchart illustrating a method for an acknowledge (ACK) feedback policy configuration and feedback according to an exemplary embodiment.

In an alternative embodiment, referring to FIG. 12, FIG. 12 is a schematic flowchart illustrating a method for an acknowledge (ACK) feedback policy configuration and feedback according to an embodiment. The method can include the following steps.

In step 401, in response to that first data frames corresponding to a same traffic identifier (TID) are to be transmitted to a receiving terminal through multiple connections, the transmitting terminal configures bit values of multiple bits included in a second control field in each of the block acknowledgement request (BAR) frames transmitted through the respective connections as a second combined value.

The second combined value is a combination of multiple bit values in the second control field which is pre-agreed as corresponding to the target ACK feedback policy.

In step 402, the BAR frames are transmitted to the receiving terminal through the respective connections, and the target ACK feedback policy is negotiated with the receiving terminal.

In step 403, the second data frames are transmitted to the receiving terminal through the respective connections. In response to that the bit values of multiple bits included in the second control field in the received BAR frame match a first reserved combined value, the target ACK feedback policy is configured to instruct the receiving terminal to feed back receiving states of the second data frames received through the respective connections via a same target connection. The target connection is any one of the multiple connections, or the target connection is a connection different from the multiple connections.

In step 404, the receiving terminal feeds back the receiving states of the second data frames received through the respective connections based on a same target ACK feedback policy. The receiving terminal can determine the target connection according to the connection identifier corresponding to the bit values of multiple bits included in a third control field in the MAC frame header of each of the second data frames, and feed back the receiving states of the second data frames received through the respective connections via the target connection.

In the above embodiment, there is provided a multi-connectivity ACK feedback policy, so that the transmitting terminal can more accurately and quickly determine the receiving states of the second data frames received by the receiving terminal through the respective connections, thereby not only reducing the transmission latency, but also improving the network throughput.

Corresponding to the foregoing examples of an application function implementation method, the present disclosure further provides examples of an application function implementation apparatus.

Figure 13:
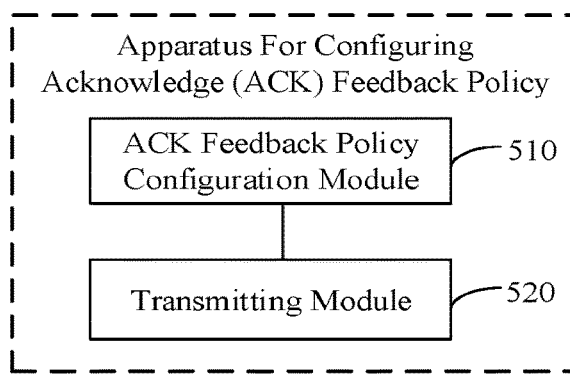
FIG. 13 is a block diagram illustrating an apparatus for configuring an acknowledge (ACK) feedback policy according to an exemplary embodiment.

Referring to FIG. 13, FIG. 13 is a block diagram illustrating an apparatus for configuring an acknowledge (ACK) feedback policy according to an exemplary embodiment. The apparatus includes an ACK feedback policy configuration module 510 is configured to, in response to that first data frames corresponding to a same traffic identifier (TID) are to be transmitted to a receiving terminal through multiple connections, configure ACK feedback policies for second data frames transmitted through respective connections in the multiple connections as a same target ACK feedback policy, where the second data frames are at least the same as a part of the first data frames, and a transmitting module 520 configured to transmit the second data frames to the receiving terminal through the respective connections.

In some examples, a number of the first data frames is one, respective numbers of the second data frames transmitted through the respective connections are of a number of one and all are the same as the first data frames, and the ACK feedback policy configuration module 510 includes a first configuration submodule configured to configure bit values of multiple bits included in a first control field in a media access control (MAC) frame header of the second data frame transmitted through each of the respective connections as a first combined value, where the first combined value is a combination of multiple bit values in the first control field which is pre-agreed as corresponding to the target ACK feedback policy.

In some examples, the target ACK feedback policy is configured to instruct the receiving terminal to feed back receiving states of the second data frames received through the respective connections via a same target connection. In some examples, a number of the first data frames is more than one, respective numbers of the second data frames transmitted through the respective connections are of a number of more than one and the second data frames are different from each other, a sum number of all the second data frames is the same as the number of the first data frames. Additionally, the apparatus can further include a first determining module configured to negotiate the target ACK feedback policy with the receiving terminal.

In some examples, the first determining module includes a first determining submodule configured to transmit block acknowledgment request (BAR) frames to the receiving terminal through the respective connections; and negotiate the target ACK feedback policy with the receiving terminal.

In some examples, the ACK feedback policy configuration module 510 includes a second configuration submodule configured to configure bit values of multiple bits included in a second control field in the BAR frames transmitted through the respective connections as a second combined value, where the second combined value is a combination of multiple bit values in the second control field which is pre-agreed as corresponding to the target ACK feedback policy.

In some examples, in response to that the second combined value matches a first reserved combined value, the target ACK feedback policy is configured to instruct the receiving terminal to feed back receiving states of the second data frames received through the respective connections via a same target connection.

In some examples, the apparatus further includes a configuration module configured to configure bit values of multiple bits included in a subtype value field of a third control field in a MAC frame header of the second data frame as a second reserved combined value, where the second reserved combined value is a combination of multiple bit values reserved in the subtype value field to indicate a connection identifier of the target connection.

In some examples, the target connection is any one of the multiple connections, or the target connection is a connection different from the multiple connections.

Figure 14:
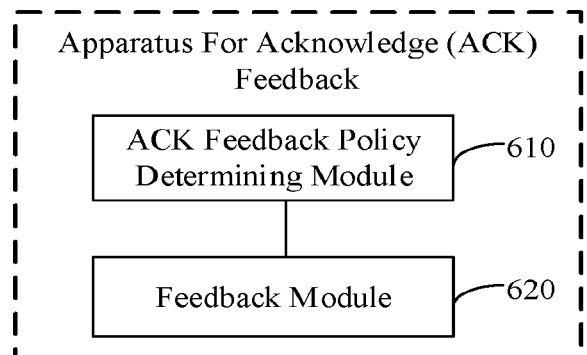
FIG. 14 is a block diagram illustrating an apparatus for an acknowledge (ACK) feedback according to an exemplary embodiment.

Referring to FIG. 14, FIG. 14 is a block diagram illustrating an apparatus for an acknowledge (ACK) feedback according to an exemplary embodiment. The apparatus includes an ACK feedback policy determining module 610 configured to determine a target ACK feedback policy, where the target ACK feedback policy is an ACK feedback policy configured by a transmitting terminal for a receiving terminal to feed back receiving states of second data frames after receiving the second data frames through respective connections in multiple connections, and the second data frames are at least the same as a part of first data frames corresponding to a same traffic identifier (TID), and a feedback module 620) configured to feed back the receiving states of the second data frames received through the respective connections based on the same target ACK feedback policy.

In some examples, the ACK feedback policy determining module 610 includes a second determining submodule configured to, in response to that the second data frames received through the respective connections are the same as the first data frames and respective numbers of the second data frames are of a number of one, determine bit values of multiple bits included in a first control field in a MAC frame header of each of the second data frames, and a third determining submodule configured to, according to a pre-agreed corresponding relationship between different combined values in the first control field with policies, determine a policy corresponding to the bit values of multiple bits included in the first control field in the MAC frame header of each of the second data frames as the target ACK feedback policy.

In some examples, the target ACK feedback policy is configured to instruct the receiving terminal to feed back receiving states of the second data frames received through the respective connections via a same target connection.

In some examples, the ACK feedback policy determining module 610 includes a fourth determining submodule configured to, before receiving the second data frames through the respective connections, negotiate the target ACK feedback policy with the transmitting terminal.

In some examples, the fourth determining submodule includes a first determining unit configured to determine bit values of multiple bits included in a second control field in a received block acknowledgment request (BAR) frame, and a second determining unit configured to, according to a pre-agreed corresponding relationship between different combinations of bit values in the second control field with policies, determine a policy corresponding to the bit values of multiple bits included in the second control field in the BAR frame as the negotiated target ACK feedback policy.

In some examples, in response to that the bit values of multiple bits included in the second control field in the received BAR frame match a first reserved combined value, the target ACK feedback policy is configured to instruct the receiving terminal to feed back receiving states of the second data frames received through the respective connections via a same target connection.

In some examples, the apparatus further includes a second determining module configured to, after receiving the second data frames through the respective connections, determine bit values of multiple bits included in a third control field in a MAC frame header of each of the second data frames, and a third determining module configured to, in response to that the bit values of multiple bits included in a third control field combine into a second reserved combined value, determining a connection identifier of the target connection according to a pre-agreed corresponding relationship between reserved combined values with connection identifiers.

In some examples, the target connection is any one of the multiple connections, or the target connection is a connection different from the multiple connections.

For the apparatus embodiment, since it basically corresponds to the method embodiment, the relevant part may refer to the part of the description of the method embodiment. The apparatus embodiments described above are merely illustrative, where the units described as separate components may or may not be physically separated, and the components displayed as units may or may not be physical units. That is, they may be located in one place or may be distributed to a plurality of network units. Some or all of the modules may be selected according to actual needs, to achieve the objectives of the solutions of the present disclosure. Those skilled in the art may understand and implement without creative labor.

Accordingly, the present disclosure further provides a computer readable storage medium storing a computer program, where the computer program is configured to execute the method for configuring the acknowledge (ACK) feedback policy described in any one of the above embodiments.

Accordingly, the present disclosure further provides a computer readable storage medium storing a computer program, where the computer program is configured to execute the method for the acknowledge (ACK) feedback described in any one of the above embodiments.

Accordingly, the present disclosure further provides an apparatus for configuring an acknowledge (ACK) feedback policy, including a processor, and a memory for storing instructions executable by the processor. The processor is configured to execute the method for configuring the acknowledge (ACK) feedback policy described in any one of the above embodiments.

Figure 15:
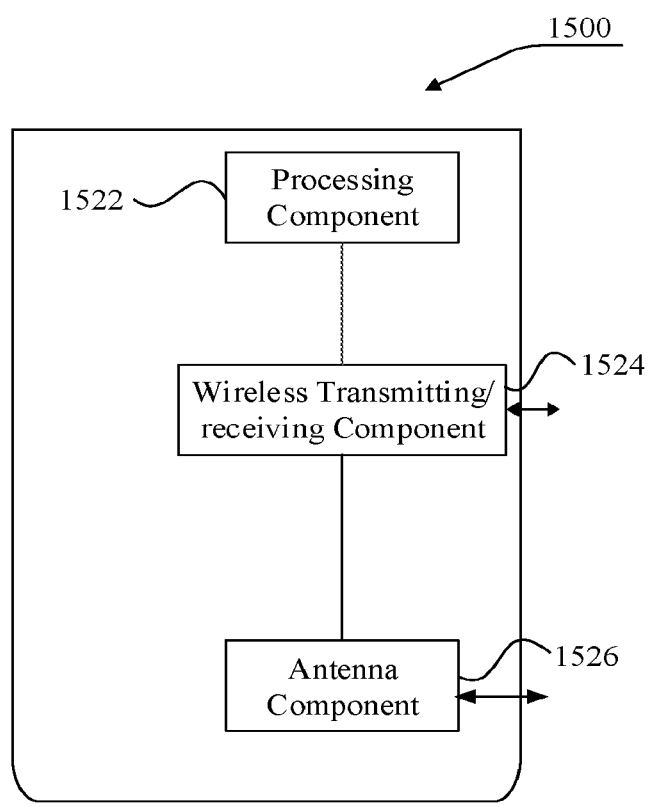
FIG. 15 is a schematic structural diagram illustrating an apparatus for configuring an acknowledge (ACK) feedback policy according to an exemplary embodiment.

As shown in FIG. 15, FIG. 15 is a schematic structural diagram illustrating an apparatus for configuring an acknowledge (ACK) feedback policy according to an exemplary embodiment. The apparatus 1500 can be provided as a transmitting terminal. Referring to FIG. 15, the apparatus 1500 includes a processing component 1522, a wireless transmitting/receiving component 1524, an antenna component 1526 and a signal processing part specific to a wireless interface. The processing component 1522 can further include one or more processors.

One of the processors in the processing component 1522 can be configured to implement the method for configuring the acknowledge (ACK) feedback policy described in any one of the above embodiments.

Accordingly, the present disclosure further provides an apparatus for an acknowledge (ACK) feedback, including a processor and a memory for storing instructions executable by the processor. The processor is configured to execute the method for the acknowledge (ACK) feedback described in any one of the above embodiments.

Figure 16:
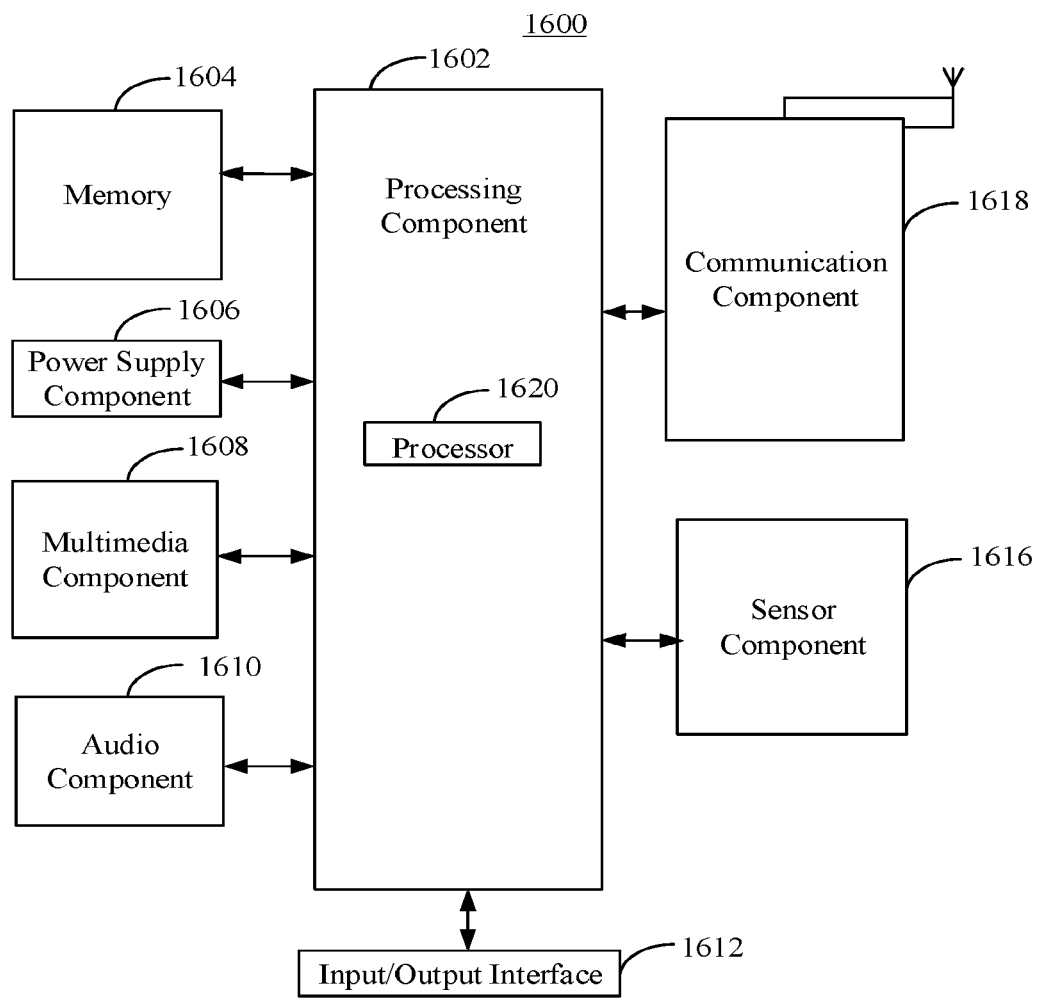
FIG. 16 is a schematic structural diagram illustrating an electronic device according to an exemplary embodiment.

FIG. 16 is a schematic structural diagram illustrating an electronic device 1600 according to an exemplary embodiment. For example, the electronic device 1600 can be user equipment (UE).

Referring to FIG. 16, the electronic device 1600 may include one or more of the following components: a processing component 1602, a memory 1604, a power supply component 1606, a multimedia component 1608, an audio component 1610, an input/output (I/O) interface 1612, a sensor component 1616 and a communication component 1618.

The processing component 1602 generally controls overall operations of the electronic device 1600, such as operations associated with display, phone calls, data communications, camera operations, and recording operations. The processing component 1602 may include one or more processors 1620 to execute instructions to complete all or part of the steps of the above methods for the acknowledge (ACK) feedback. In addition, the processing component 1602 may include one or more modules which facilitate the interaction between the processing component 1602 and other components. For example, the processing component 1602 may include a multimedia module to facilitate the interaction between the multimedia component 1608 and the processing component 1602. For another example, the processing component 1602 can read executable instructions from the memory to implement the steps of the method for the acknowledge (ACK) feedback provided by the above embodiments.

The memory 1604 is to store various types of data to support the operation of the electronic device 1600. Examples of such data include instructions for any application or method operated on the electronic device 1600, contact data, phonebook data, messages, pictures, videos, and so on. The memory 1604 may be implemented by any type of volatile or non-volatile storage devices or a combination thereof, such as a Static Random-Access Memory (SRAM), an Electrically-Erasable Programmable Read Only Memory (EEPROM), an Erasable Programmable Read Only Memory (EPROM), a Programmable read-only memory (PROM), a Read Only Memory (ROM), a magnetic memory, a flash memory, a magnetic or optical disk.

The power supply component 1606 provides power to different components of the electronic device 1600. The power supply component 1606 may include a power management system, one or more power supplies, and other components associated with generating, managing, and distributing power for the electronic device 1600.

The multimedia component 1608 includes a screen providing an output interface between the electronic device 1600 and a user. In some embodiments, the multimedia component 1608 may include a front camera and/or a rear camera. The front camera and/or rear camera may receive external multimedia data when the electronic device 1600 is in an operating mode, such as a photographing mode or a video mode. Each of the front camera and the rear camera may be a fixed optical lens system or have focal length and optical zooming capability.

The audio component 1610 is configured to output and/or input an audio signal. For example, the audio component 1610 includes a microphone (MIC). When the electronic device 1600 is in an operating mode, such as a call mode, a recording mode, and a voice recognition mode, the MIC is to receive an external audio signal. The received audio signal may be further stored in the memory 1604 or transmitted via the communication component 1618. In some embodiments, the audio component 1610 further includes a speaker to output an audio signal.

The I/O interface 1612 may provide an interface between the processing component 1602 and peripheral interface modules. The above peripheral interface modules may include a keyboard, a click wheel, buttons and so on. These buttons may include, but are not limited to, a home button, a volume button, a starting button and a locking button.

The sensor component 1616 includes one or more sensors to provide status assessments of various aspects for the electronic device 1600. For example, the sensor component 1616 may detect the on/off status of the electronic device 1600, and relative positioning of component, for example, the component is a display and a keypad of the electronic device 1600. The sensor component 1616 may also detect a change in position of the electronic device 1600 or a component of the electronic device 1600, a presence or absence of the contact between a user and the electronic device 1600, an orientation or an acceleration/deceleration of the electronic device 1600, and a change in temperature of the electronic device 1600. The sensor component 1616 may include a proximity sensor to detect the presence of a nearby object without any physical contact. The sensor component 1616 may further include an optical sensor, such as a Complementary Metal Oxide Semiconductor (CMOS) or Charge-coupled Device (CCD) image sensor which is used in imaging applications. In some embodiments, the sensor component 1616 may further include an acceleration sensor, a gyroscope sensor, a magnetic sensor, a pressure sensor, or a temperature sensor.

The communication component 1618 is configured to facilitate wired or wireless communication between the electronic device 1600 and other devices. The electronic device 1600 may access a wireless network that is based on any communication standard, such as Wi-Fi, 2G, 3G, 4G or 5G, or a combination thereof. In an exemplary embodiment, the communication component 1618 receives a broadcast signal or broadcast-associated information from an external broadcast management system via a broadcast channel. In an exemplary embodiment, the communication component 1618 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Blue Tooth (BT) technology and other technologies.

In an exemplary embodiment, the electronic device 1600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above method for the acknowledge (ACK) feedback.

In an exemplary embodiment, there is also provided a non-transitory computer readable storage medium including instructions, such as the memory 1604 including instructions. The instructions may be executed by the processor 1620 of the electronic device 1600 to perform the above method for the acknowledge (ACK) feedback. For example, the non-transitory computer readable storage medium may be a ROM, a Random Access Memory (RAM), a CD-ROM, a magnetic tape, a floppy disk, an optical data storage device, and the like.

In the embodiments of the present disclosure, when it is determined that the first data frames corresponding to the same TID are to be transmitted to the receiving terminal through the multiple connections, the transmitting terminal can configure the ACK feedback policies for the second data frames transmitted through the respective connections in the multiple connections as the same target ACK feedback policy, where the second data frames are at least the same as the part of the first data frames. Therefore, there is provided a multi-connectivity ACK feedback policy, and the ACK feedback policies for the second data frames transmitted through the respective connections are the same, and thus the transmitting terminal can more accurately and quickly determine the receiving states of the second data frames received by the receiving terminal through the respective connections, which not only reduces the transmission latency, but also improves the network throughput.

In the embodiments of the present disclosure, if the number of the first data frames is one, the number of the second data frames transmitted through each of the multiple connections is also one and is the same as the first data frame, and the bit values of multiple bits included in the first control field in the MAC frame header of the second data frame transmitted through the each of the respective connections can be configured as the first combined value, where the first combined value is a combination of multiple bit values in the first control field which is pre-agreed as corresponding to the target ACK feedback policy. On the basis of ensuring communication reliability, the ACK feedback policies for the second data frames transmitted through the respective connections are the same can be ensured to be the same.

In the embodiments of the present disclosure, if the number of the first data frames is more than one, the number of the second data frames transmitted through each of the multiple connections is more than one and are different from each other, and a sum of all the second data frames is the same as the number of the first data frames, before transmitting the second data frames to the receiving terminal through the respective connections, the target ACK feedback policy can be negotiated with the receiving terminal. The transmitting terminal can negotiate the target ACK feedback policy with the receiving terminal by transmitting the BAR frames. In some examples, when configuring the target ACK feedback policy, the bit values of multiple bits included in the second control field in each of the BAR frames can be configured as the second combined value, where the second combined value is a combination of multiple bit values in the second control field which is pre-agreed as corresponding to the target ACK feedback policy, thereby reducing the transmission latency and improving the network throughput.

In the embodiments of the present disclosure, the target ACK feedback policy can be configured to instruct the receiving terminal to feed back the receiving states of the second data frames received through the respective connections via the same target connection. In the embodiments of the present disclosure, the connection identifier of the target connection can be indicated by configuring bit values of multiple bits included in the subtype value field of the third control field in the MAC frame header of the second data frame, thereby having high availability.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It should be understood that the present disclosure is not limited to the above described structures shown in the drawings, and various modifications and changes can be made to the present disclosure without departing from the scope thereof. The scope of the present disclosure is to be limited only by the appended claims.

The invention claimed is:

1. A method for configuring an acknowledge (ACK) feedback policy, comprising:
in response to that first data frames corresponding to a same traffic identifier (TID) are to be transmitted to a receiving terminal through multiple connections, configuring ACK feedback policies for second data frames transmitted through respective connections in the multiple connections as a same target ACK feedback policy, wherein the second data frames are at least the same as a part of the first data frames; and
transmitting the second data frames to the receiving terminal through the respective connections;
wherein a number of the first data frames is one, respective numbers of the second data frames transmitted through the respective connections are of a number of one and all are the same as the first data frames, and configuring the ACK feedback policies for the second data frames transmitted through the respective connections in the multiple connections as the same target ACK feedback policy comprises:
configuring bit values of multiple bits comprised in a first control field in a media access control (MAC) frame header of the second data frame transmitted through each of the respective connections as a first combined value, wherein the first combined value is a combination of multiple bit values in the first control field which is pre-agreed as corresponding to the target ACK feedback policy; or
wherein a number of the first data frames is more than one, respective numbers of the second data frames transmitted through the respective connections are of a number of more than one and the second data frames are different from each other, a sum number of all the second data frames is the same as the number of the first data frames, and before transmitting the second data frames to the receiving terminal through the respective connections, the method further comprises:
negotiating the target ACK feedback policy with the receiving terminal.

2. The method according to claim 1, wherein the target ACK feedback policy is configured to instruct the receiving terminal to feed back receiving states of the second data frames received through the respective connections via a same target connection.

3. The method according to claim 1, wherein negotiating the target ACK feedback policy with the receiving terminal comprises:
transmitting block acknowledgment request (BAR) frames to the receiving terminal through the respective connections; and negotiating the target ACK feedback policy with the receiving terminal.

4. The method according to claim 3, wherein configuring the ACK feedback policies for the second data frames transmitted through the respective connections in the multiple connections as the same target ACK feedback policy comprises:
configuring bit values of multiple bits comprised in a second control field in the BAR frames transmitted through the respective connections as a second combined value, wherein the second combined value is a combination of multiple bit values in the second control field which is pre-agreed as corresponding to the target ACK feedback policy.

5. The method according to claim 4, wherein in response to that the second combined value matches a first reserved combined value, the target ACK feedback policy is configured to instruct the receiving terminal to feed back receiving states of the second data frames received through the respective connections via a same target connection.

6. The method according to claim 5, wherein before transmitting the second data frames to the receiving terminal through the respective connections, the method further comprises:
configuring bit values of multiple bits comprised in a subtype value field of a third control field in a MAC frame header of the second data frame as a second reserved combined value, wherein the second reserved combined value is a combination of multiple bit values reserved in the subtype value field to indicate a connection identifier of the target connection.

7. The method according to claim 5, wherein the target connection is any one of the multiple connections, or the target connection is a connection different from the multiple connections.

8. A method for an acknowledge (ACK) feedback, comprising:
  determining a target ACK feedback policy, wherein the target ACK feedback policy is an ACK feedback policy configured by a transmitting terminal for a receiving terminal to feed back receiving states of second data frames after receiving the second data frames through respective connections in multiple connections, and the second data frames are at least the same as a part of first data frames corresponding to a same traffic identifier (TID); and
  feeding back the receiving states of the second data frames received through the respective connections based on the same target ACK feedback policy,
  wherein determining the target ACK feedback policy comprises:
  in response to that the second data frames received through the respective connections are the same as the first data frames and respective numbers of the second data frames are of a number of one, determining bit values of multiple bits comprised in a first control field in a MAC frame header of each of the second data frames; and
  according to a pre-agreed corresponding relationship between different combined values in the first control field with policies, determining a policy corresponding to the bit values of multiple bits comprised in the first control field in the MAC frame header of each of the second data frames as the target ACK feedback policy.

9. The method according to claim 8, wherein the target ACK feedback policy is configured to instruct the receiving terminal to feed back receiving states of the second data frames received through the respective connections via a same target connection.

10. The method according to claim 8, wherein determining the target ACK feedback policy comprises:
  before receiving the second data frames through the respective connections, negotiating the target ACK feedback policy with the transmitting terminal.

11. The method according to claim 10, wherein negotiating the target ACK feedback policy with the transmitting terminal comprises:
  determining bit values of multiple bits comprised in a second control field in a received block acknowledgment request (BAR) frame; and
  according to a pre-agreed corresponding relationship between different combinations of bit values in the second control field with policies, determining a policy corresponding to the bit values of multiple bits comprised in the second control field in the BAR frame as the negotiated target ACK feedback policy.

12. The method according to claim 11, wherein in response to that the bit values of multiple bits comprised in the second control field in the received BAR frame match a first reserved combined value, the target ACK feedback policy is configured to instruct the receiving terminal to feed back receiving states of the second data frames received through the respective connections via a same target connection.

13. The method according to claim 12, further comprising:
  after receiving the second data frames through the respective connections, determining bit values of multiple bits comprised in a third control field in a MAC frame header of each of the second data frames; and
  in response to that the bit values of multiple bits comprised in a third control field combine into a second reserved combined value, determining a connection identifier of the target connection according to a pre-agreed corresponding relationship between reserved combined values with connection identifiers.

14. The method according to claim 12, wherein the target connection is any one of the multiple connections, or the target connection is a connection different from the multiple connections.

15. A non-transitory computer readable storage medium storing a computer program, wherein the computer program is configured to execute the method for configuring the acknowledge (ACK) feedback policy according to claim 1.

16. An apparatus for configuring an acknowledge (ACK) feedback policy, comprising:
  a processor; and
  a memory for storing instructions executable by the processor,
  wherein the processor is configured to:
  in response to that first data frames corresponding to a same traffic identifier (TID) are to be transmitted to a receiving terminal through multiple connections, configure ACK feedback policies for second data frames transmitted through respective connections in the multiple connections as a same target ACK feedback policy, wherein the second data frames are at least the same as a part of the first data frames; and
  transmit the second data frames to the receiving terminal through the respective connections;
  wherein a number of the first data frames is one, respective numbers of the second data frames transmitted through the respective connections are of a number of one and all are the same as the first data frames, and the processor is configured to:
  configure bit values of multiple bits comprised in a first control field in a media access control (MAC) frame header of the second data frame transmitted through each of the respective connections as a first combined value, wherein the first combined value is a combination of multiple bit values in the first control field which is pre-agreed as corresponding to the target ACK feedback policy; or
  wherein a number of the first data frames is more than one, respective numbers of the second data frames transmitted through the respective connections are of a number of more than one and the second data frames are different from each other, a sum number of all the second data frames is the same as the number of the first data frames, and the processor is configured to:
  negotiate the target ACK feedback policy with the receiving terminal.

17. An apparatus for an acknowledge (ACK) feedback, comprising:
  a processor; and
  a memory for storing instructions executable by the processor,
  wherein the processor is configured to execute the method for the acknowledge (ACK) feedback according to claim 8.

* * * * *